(12) United States Patent
Rezachek et al.

(10) Patent No.: US 7,445,860 B2
(45) Date of Patent: **\*Nov. 4, 2008**

(54) ELECTRICAL POWER GENERATOR

(75) Inventors: Thomas Rezachek, Cottage Grove, MN (US); Roland A. Wood, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 607 days.

This patent is subject to a terminal disclaimer.

(21) Appl. No.: 10/780,827

(22) Filed: Feb. 18, 2004

(65) Prior Publication Data

US 2004/0161646 A1   Aug. 19, 2004

Related U.S. Application Data

(63) Continuation-in-part of application No. 09/941,247, filed on Aug. 28, 2001, now Pat. No. 7,001,681.

(60) Provisional application No. 60/448,573, filed on Feb. 19, 2003.

(51) Int. Cl.
*H01M 8/04* (2006.01)
*H01M 8/06* (2006.01)

(52) U.S. Cl. .............................. 429/19; 429/25; 429/34

(58) Field of Classification Search .................. None
See application file for complete search history.

(56) References Cited

U.S. PATENT DOCUMENTS

| | | | | |
|---|---|---|---|---|
| 3,133,837 A | | 5/1964 | Eidensohn | 136/86 |
| 4,055,632 A | * | 10/1977 | Hoffman et al. | 423/657 |
| 4,155,712 A | | 5/1979 | Taschek | 422/239 |
| 4,261,955 A | * | 4/1981 | Bailey et al. | 422/239 |
| 5,372,617 A | | 12/1994 | Kerrebrock et al. | 48/61 |
| 5,804,329 A | | 9/1998 | Amendola | 429/34 |
| 5,836,750 A | | 11/1998 | Cabuz | 417/322 |
| 5,942,344 A | * | 8/1999 | Lehmeier et al. | 429/13 |
| 6,093,501 A | * | 7/2000 | Werth | 429/17 |

(Continued)

FOREIGN PATENT DOCUMENTS

WO   WO 01/085606   11/2001
WO   WO 03/020635   3/2003

OTHER PUBLICATIONS

Aiello, R. et al. "Production of Hydrogen From Chemical Hydrides via Hydrolysis With Steam." *International Journal of Hydrogen Energy*, Elsevier Science Publishers B.V. vol. 24, No. 12. Dec. 1999, pp. 1123-1130.

(Continued)

*Primary Examiner*—Jonathan Crepeau
(74) *Attorney, Agent, or Firm*—Kris T. Fredrick

(57) ABSTRACT

An improved system for generating electrical power using a fuel cell. More particularly, a system for generating hydrogen gas by reacting water vapor with a substantially non-fluid substance and transporting the generated hydrogen gas to the fuel cell which generates electrical power. Reacting water vapor with the non-fluid hydrogen generating substance rather than liquid water prevents caking of the non-fluid substance and deposition of byproducts onto the non-fluid substance that interfere with continued generation of hydrogen gas. Also, a non-electrically actuated valve for use in a hydrogen gas generating apparatus which regulates the generation of hydrogen as required by the fuel cell.

28 Claims, 10 Drawing Sheets

U.S. PATENT DOCUMENTS

| | | | |
|---|---|---|---|
| 6,250,078 B1 | 6/2001 | Amendola et al. | 60/509 |
| 6,358,488 B1* | 3/2002 | Suda | 423/657 |
| 7,001,681 B2* | 2/2006 | Wood | 429/17 |
| 2002/0076589 A1* | 6/2002 | Bostaph et al. | 429/22 |
| 2003/0044656 A1* | 3/2003 | Wood | 429/19 |
| 2006/0040152 A1* | 2/2006 | Wood | 429/19 |

OTHER PUBLICATIONS

Amendola, S.C. et al., "A Safe, Portable, Hydrogen Gas Generator Using Aqueous Borohydride Solution and Ru Catalyst", International Journal of Hydrogen Energy; vol. 25, No. 10, p. 969-975, Oct. 2000.

Amendola, S.C. et al., "A Novel High Power Density Borohydride-Air Cell"; Electrochemical Society Proceedings; Abstract; vol. 98-15; pp. 47-54, Nov. 1, 1998.

Amendola, S.C. et al.; An Ultrasafe Hydrogen Genrator: Aqueous, Alkaline Borohydride Solutions and Ru Catalyst; Abstract; Journal of Power Sources; vol. 85, No. 5; p. 186-9, Feb. 2000.

"U.S. Appl. No. 11/247,435 (Atty. Ref.256.338US1) Final Office Action mailed Mar. 17, 2008", FOAR, 10 pgs.

* cited by examiner

DOUBLE POLISHED Si WAFER WITH THERMAL OXIDE AND LPCVD NITRIDE SUITABLE
FOR CREATING THROUGH THE WAFER ETCH HOLES

STRIP OFF NITRIDE AND OXIDE FROM FRONT OF WAFER, GROW THIN THERMAL
OXIDE AND BRIDGE DIELECTRIC (NITRIDE)

DEPOSIT AND PATTERN LOWER ELECTRODE, SUCH AS TiW/Au OR Cr/Au

DEPOSIT AND PATTERN LOWER ELECTRODE, SUCH AS TiW/Au OR Cr/Au

ETCH FROM BACKSIDE TO RELEASE DIAPHRAGMS

APPLY CATALYTIC PASTE BY "DOCTOR BLADING"

ELECTRICAL POWER GENERATOR

CROSS REFERENCE TO RELATED APPLICATION

This application is a continuation in part of U.S. patent application Ser. No. 09/941,247, now U.S. Pat. No. 7,001,681, filed Aug. 28, 2001 which is incorporated herein by reference, and claims the benefit of co-pending U.S. provisional patent application Ser. No. 60/448,573 filed Feb. 19, 2003.

BACKGROUND OF THE INVENTION

1. Field of the Invention

The invention relates to an improved system for generating electrical power using a fuel cell. More particularly, the invention pertains to a system for generating hydrogen gas by reacting water vapor with a substantially non-fluid substance in a regulated manner, and transporting the generated hydrogen gas to the fuel cell which in turn generates electrical power. The invention also relates to a pneumatic valve for use in a hydrogen gas generating apparatus.

2. Description of the Related Art

Similar to batteries, fuel cells function to produce electric power through chemical reactions. Rather than storing reactants as batteries do, fuel cells are operated by continuously supplying reactants to the cell. Proton exchange membrane (PEM) fuel cells operating with $H_2$ from hydrocarbon liquids have emerged as leading candidates to replace batteries in portable electronic devices, power cleaners, more fuel efficient vehicles and for powering microelectromechanical systems (MEMS) devices such as MEMS electrical power generators. In a typical fuel cell, hydrogen gas acts as one reactant and oxygen as the other, with the two reacting at electrodes to form water molecules and releasing energy in the form of direct current electricity. This direct current electricity may then be converted into an alternating current. The system may produce electricity continuously as long as hydrogen and oxygen are provided. While oxygen is typically provided from the air, it is generally necessary to generate hydrogen gas from other compounds through controlled chemical reactions rather than storing hydrogen, because storing of hydrogen gas requires that it either be compressed or cryogenically cooled. As fuel cell technology evolves, so do the means by which hydrogen gas is generated for application with fuel cells.

Currently, there are various methods which are known and employed for generating hydrogen gas. The predominant method is by a process known as reformation in which fossil fuels are broken down into their hydrogen and carbon products. However, this system is undesirable in the long term because it is dependent upon a non-renewable resource. Another method is electrolysis, in which hydrogen is split from water molecules. However, this method is not well suited for large scale applications, such as use in automobiles. Another means of generating hydrogen gas is by reversibly adsorbing and releasing hydrogen gas from metal hydrides or alloys through heating. While this method is useful, it is not preferred because the metal hydrides are typically very heavy, expensive and only release small quantities of hydrogen. Yet another means by which hydrogen gas is generated is through reactive chemical hydrides. This process involves chemically generating hydrogen gas from dry, highly reactive solids by reacting them with liquid water or acids. Chemicals especially suitable for this process are lithium hydride, calcium hydride, $B_{10}H_{14}$, lithium aluminum hydride and sodium borohydride, each of which are capable of releasing plentiful quantities of hydrogen. The disadvantages associated with this method is that reaction products from the chemical and liquid water typically form a cake or pasty substance which interferes with further reaction of the reactive chemical with the liquid water or acid.

It is of great interest in the art to provide a means by which hydrogen gas may be generated in a regulated manner for use in fuel cells, without relying on non-renewable resources and without the disadvantages of each of the aforementioned methods. The present invention provides a solution to this problem. The invention provides an electrical power generator and a process for controllably generating hydrogen gas at the rate that a fuel cell requires it. The electrical power generator comprises a water vapor generator at least partially filled with water vapor, at least one hydrogen gas generator connected to the water vapor generator, a regulating valve and a fuel cell connected to the hydrogen gas generator, the hydrogen generation chamber being at least partially filled with a substantially non-fluid substance which reacts with water vapor to generate hydrogen gas. The hydrogen gas generated may then be used as a "fuel" which allows the fuel cell to generate electrical power. The present invention improves upon the related art by reacting a water vapor with a substantially non-fluid substance to controllably generate hydrogen gas, rather than liquid water. By reacting a water vapor with the aforementioned non-fluid chemical substance, it has been found that the typical problems associated with reactive chemical hydrides are avoided, resulting in a more efficient system than those of the prior art.

The invention also provides a non-electrically actuated valve suitable for use in hydrogen generating apparatuses. The valve of the invention is actuated by hydrogen overpressure to regulate the diffusion of water vapor into a powdered chemical fuel. Since the valve is non-electrically actuated, the need for a control voltage, a controller and a control voltage generator is eliminated, and the problem of electrical discharge in valves operating in humid conditions is avoided.

SUMMARY OF THE INVENTION

The invention provides an electrical power generator comprising:
a) a water vapor generator;
b) a hydrogen gas generator attached to the water vapor generator, said hydrogen generator containing a substantially non-fluid substance which reacts with water vapor to generate hydrogen gas; said hydrogen generator optionally being attached to said water vapor generator via at least one conduit; and
c) a fuel cell attached to the hydrogen gas generator; said fuel cell optionally being attached to said hydrogen gas generator via at least one conduit.

The invention also provides a process for generating hydrogen gas for fueling a fuel cell comprising:
a) directing water vapor from a water vapor generator to a hydrogen generator, said hydrogen generator being at least partially filled with a substantially non-fluid substance which reacts with water vapor to generate hydrogen gas; and
b) directing said hydrogen gas and any residual water vapor to a fuel cell.

The invention further provides an improved process for generating electrical energy wherein water and hydrogen gas are directed from a water containing chamber to a fuel cell; and water and any residual hydrogen gas are directed from the fuel cell back to the water containing chamber; and water and hydrogen gas are directed through a hydrogen gas generator, which hydrogen gas generator is connected to each of the fuel cell and water containing chamber and which hydrogen gas generator is at least partially filled with a substance which reacts with water to generate hydrogen gas, wherein the improvement comprises contacting water in the form of water vapor with a substantially non-fluid substance which reacts with water vapor to generate hydrogen gas.

The invention still further comprises a hydrogen gas generating apparatus, the apparatus comprising a housing which encloses:
a) a water vapor generator;
b) a hydrogen gas generator, comprising a substantially non-fluid substance that reacts with water vapor to generate hydrogen gas;
c) at least one conduit connecting the water vapor generator and the hydrogen gas generator, the conduit allowing for the flow of water vapor from the water vapor generator to the hydrogen gas generator; and
d) a valve positioned through said conduit for alternately opening and closing the conduit, said valve comprising:
  i) a flexible diaphragm having a periphery that is fixed to said housing;
  ii) a valve disc positioned opposite the diaphragm and mating with the conduit for alternately opening and closing the conduit;
  iii) a rod connector having opposite ends, the rod extending through a portion of the conduit and attached at one of its ends to the diaphragm and attached at its opposite end to the valve disc; and
  iv) a seal attached around a periphery of the conduit and positioned for mating with the valve disc when the valve disk is positioned to close the conduit.

DETAILED DESCRIPTION OF THE PREFERRED EMBODIMENTS

An electrical power generator is provided which generates hydrogen gas through controlled reactions of water vapor with a substantially non-fluid substance, which hydrogen gas is then used to fuel a fuel cell. The electrical energy generated may be used to power miniature devices such as wireless sensors, cellular phones or other hand held electronic devices.

Figure 1:
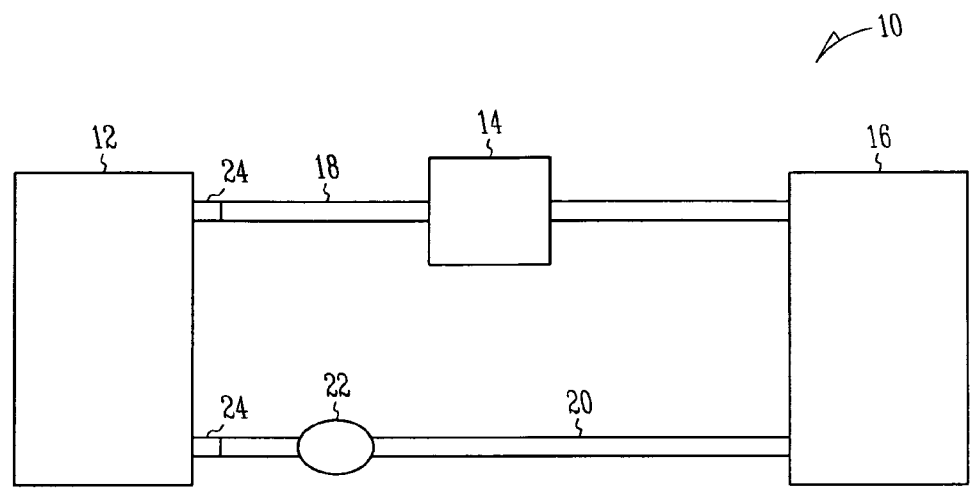
FIG. 1 is a schematic representation of an electrical power generator having a conduit and a separate return line.
Figure 2:
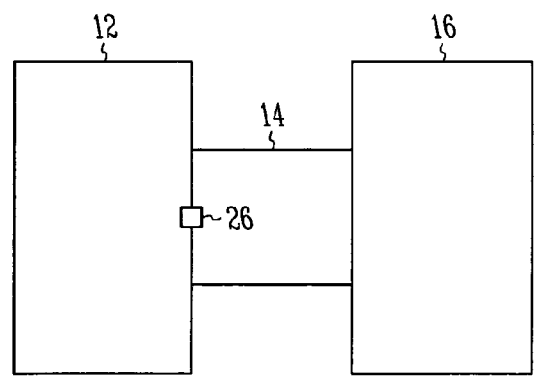
FIG. 2 is a schematic representation of an electrical power generator having neither a conduit nor a return line.
Figure 3:
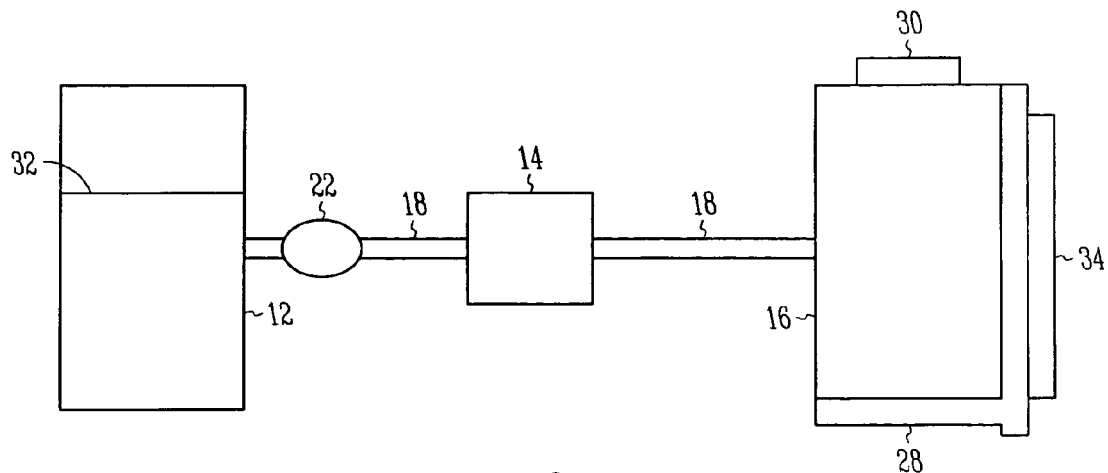
FIG. 3 is a schematic representation of an electrical power generator having a conduit connecting each of the water vapor generator, the hydrogen gas generator and the fuel cell, and also having a pump, a tensile membrane within the water vapor generator and a thermal insulator around the fuel cell.

A seen in FIGS. 1-3, the electrical power generator 10 broadly comprises at least one water vapor generator 12, at least one hydrogen gas generator 14 attached to the water vapor generator 12 and a fuel cell 16 attached to the hydrogen gas generator 14. The water vapor generator 12 is preferably a chamber that is at least partially filled with water in the form of either water vapor, liquid water or ice. The quantity of either liquid water or ice may vary and generally depends on the size of the water vapor generating chamber 12 and the application for which the power generator 10 is used. If a liquid is used, the liquid may comprise a mixture of water and alcohol, in any proportion, to prevent the liquid water from freezing until very low temperatures. In this case, the water vapor generator may generate both water and alcohol vapors. Both vapors may then enter the hydrogen generator and induce the generation of hydrogen. The preferred embodiment is to use pure water.

Should a liquid water be present within the water vapor generator 12, the liquid water may be prevented from seeping out of the water vapor generator 12 by either porous plugs 24 or by a valve 26. Porous plugs 24 comprise a porous material such as cotton or a polymeric fabric, which acts as a barrier to liquid water while allowing the passage of water vapor into and out of the water vapor generator 12.

Figure 8:
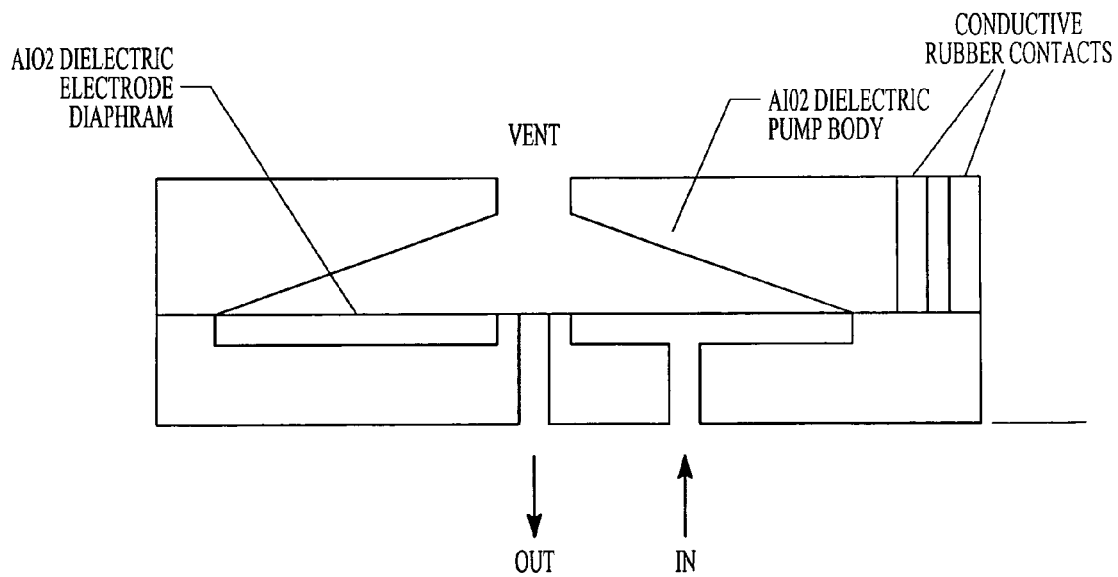
FIG. 8 illustrates a schematic representation of a mesovalve.
Figure 9:
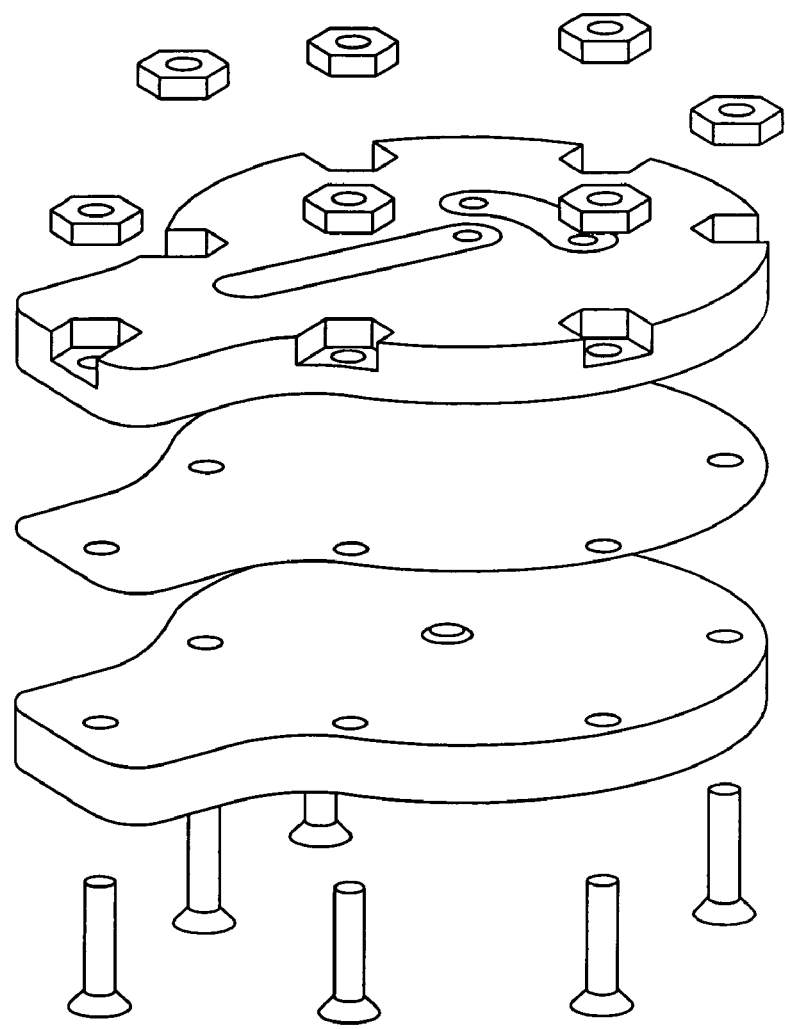
FIG. 9 illustrates a perspective view of a mesovalve.
Figure 10A:
FIGS. 10A-10I illustrate the process steps for forming a MEMS fuel cell.
Figure 10B:
Figure 10C:
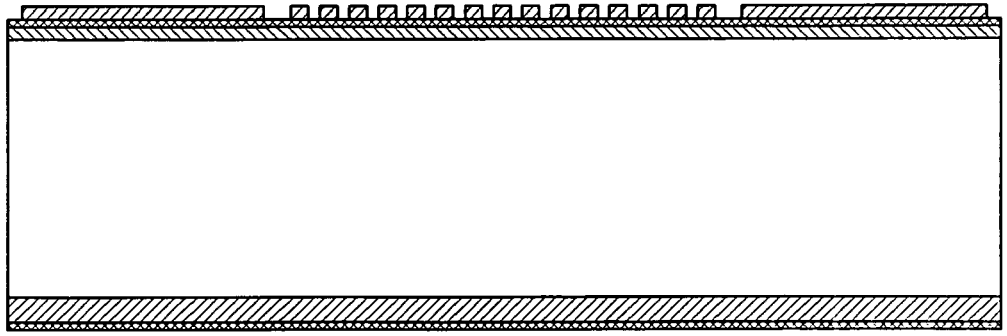
Figure 10D:
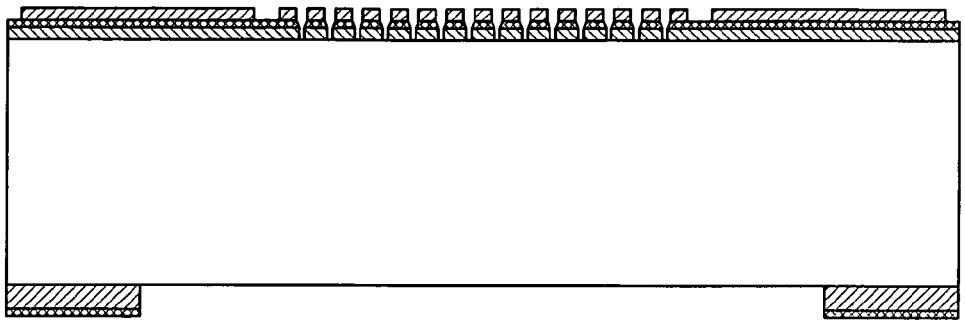
Figure 10E:
Figure 10F:
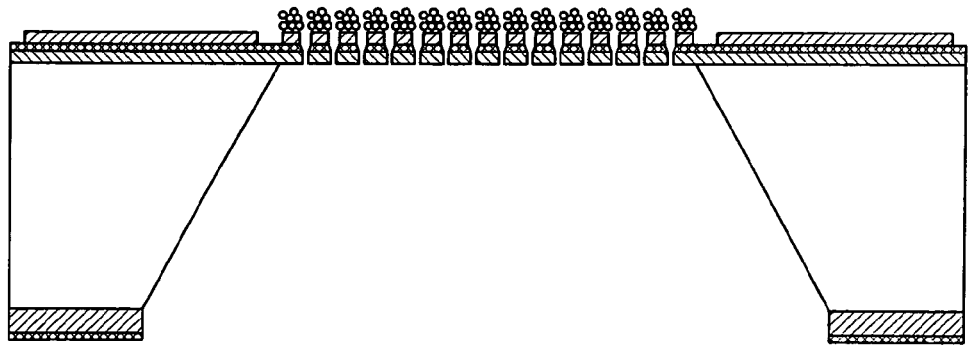
Figure 10G:
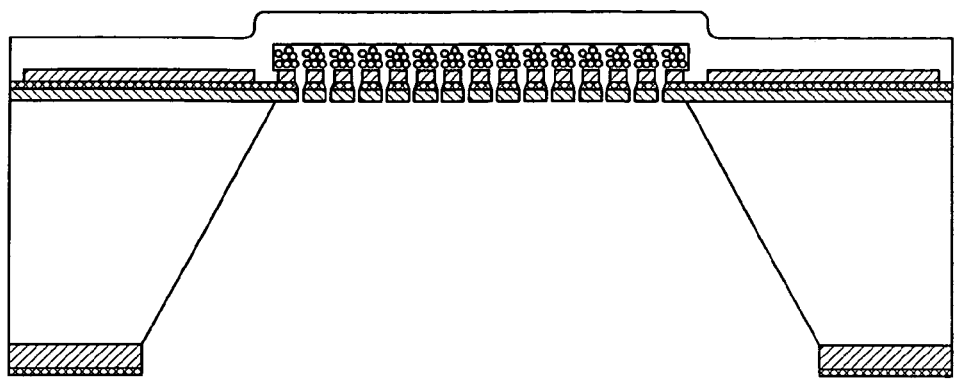
Figure 10H:
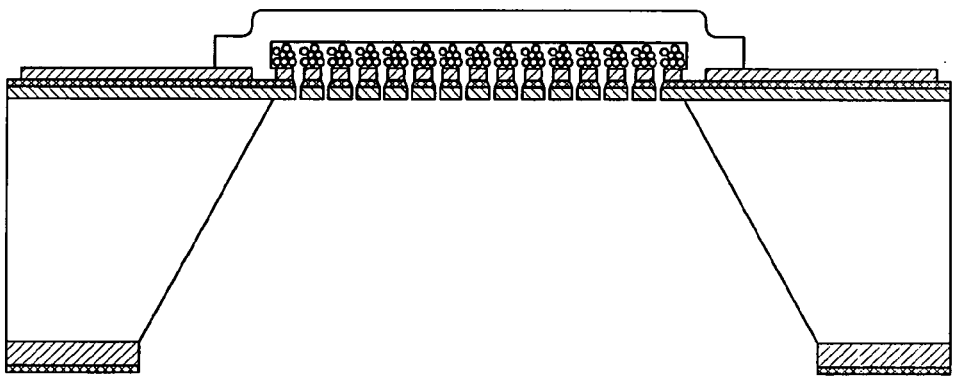
Figure 10I:
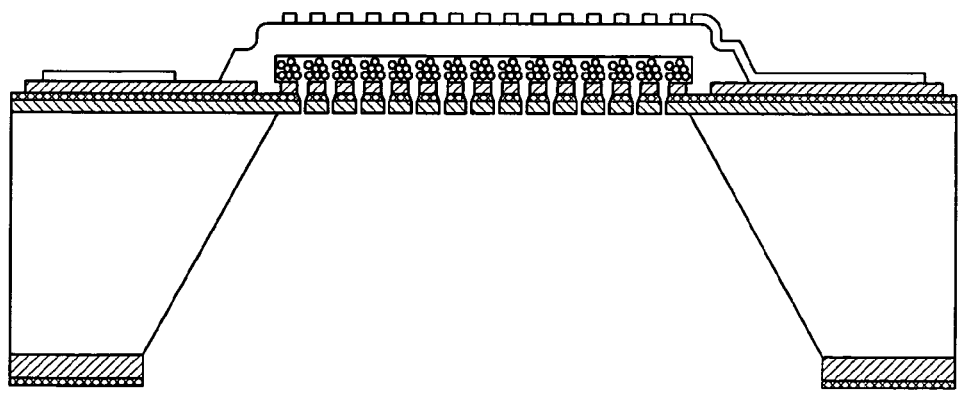

Alternately, valve 26, may regulate the passage of water vapor out of the water vapor generator 12 and prevent the seeping out of any liquid water. This embodiment is shown in FIG. 2. The valve 26 may be either a manually or pneumatically or electrically controlled valve. The preferred embodiment is a pneumatically controlled valve. If the valve is controlled electrically, the initial power necessary to open the valve, causing an initial flow of water vapor from the water vapor generator 12 to the hydrogen gas generator 14, is preferably supplied by power stored in a device 30. The valve 26 may be directly electrically connected to the device 30 or to the fuel cell 16, with the fuel cell then being electrically connected to the device 30. The device 30 may alternately be attached to either the water vapor generator 12, the hydrogen gas generator 14 or another element of the power generator 10. Once the valve 26 is initially opened to allow water vapor out of the water vapor generator 12, the power generated from the fuel cell 16 is then preferably used to supply the power for controlling the valve 26. In the preferred embodiment of the invention using an electrically controlled valve, the device 30 comprises a battery. The opening and closing of the valve 26 is preferably controlled pneumatically depending on when it is desired to generate hydrogen gas and fuel the fuel cell. Electrically controlled valves of several types exist. Preferably the electrically controlled valve is a mesovalve. Structures for useful mesovalves are shown in FIGS. 8 and 9. Mesovalves are also described in U.S. Pat. No. 5,836,750, which is incorporated herein by reference. A series of mesovalves forms a mesopump. Such ultra-light compact, water-vapor diffusive-flow regulator mesovalves, use an electrostatically actuated moving polymer membrane. Control of the mesovalve actively regulates the internal pressure of the generator since it controls water vapor access to the powder fuel chamber.

While valve 26 is only depicted in FIG. 2, it is intended that any embodiment of the present invention may include at least one valve 26. Further, several different arrangements of interconnecting the fuel cell, hydrogen generator, water vapor generator, valves and pumps are available as is evident to persons familiar with gas and vapor interconnections. It should be understood that when elements herein are described as being attached or connected together that they may be either directly or indirectly attached, unless a direct attachment is specified. Also, when the flow of water vapor and/or hydrogen gas is described herein, it should be understood that the gases may flow directly or indirectly from one element to another, unless particularly specified. For example, hydrogen gas may flow from the hydrogen gas generator to a fuel cell indirectly by the hydrogen gas first passing through the water vapor generator.

In the preferred embodiment, the power generator 10 is initially loaded with hydrogen gas within at least one of said water vapor generator 12, hydrogen gas generator 14, fuel cell 16 and said optional conduits 18 or return line 20. This initial loading of hydrogen gas will travel to the fuel cell 16, causing a reaction within the fuel cell, and generating electricity. This electricity is then used to power the valve 26. In the preferred embodiment of the invention, the power generator is always filled with hydrogen during operation. Furthermore, the fuel cell may be fed with hydrogen of lower or higher humidity, according to its exact attachment, so that the hydration of the fuel cell may be adjusted. The humidity of the hydrogen is higher in the water vapor generator, and lower in the hydrogen generator.

The dimensions of the water vapor generator 12 are preferably very small in scale, but may also vary with respect to the use of the power generator 10. In preferred small scale embodiments, the water vapor generator 12 is preferably from about 0.1 cm to about 1.0 cm in height, from about 0.1 cm to about 1.0 cm in width and from about 0.1 cm to about 1.0 cm in length. As seen in FIG. 3, optionally within the water vapor generator is a tensile membrane 32. The tensile membrane 32 acts to exert pressure on water vapor within the water vapor generator 12 forcing the water vapor out of the water vapor generator 12 and toward the hydrogen gas generator 14. The pressure within the water vapor generator 12 is preferably maintained at a pressure of slightly more than atmospheric pressure.

Attached to the water vapor generator 12 is a hydrogen gas generator 14. The hydrogen gas generator 14 is preferably in the form of a chamber and is at least partially filled with a substantially non-fluid substance which reacts with water vapor to generate hydrogen gas. Alternately, the hydrogen gas generator 14 may be a volume adjacent to the water vapor generator 12 suitable for retaining the non-fluid substance. Similar to the water vapor generator 12, the dimensions of the hydrogen gas generator 14 will vary depending on the proposed use of the power generator 10. When the hydrogen gas generator 14 comprises a chamber in a small scale application, it is preferably from about 0.1 cm to about 1.0 cm in height, from about 0.1 cm to about 1.0 cm in width and from about 0.1 cm to about 1.0 cm in length.

The substantially non-fluid substance within the hydrogen gas generator 14 preferably comprises a material in powder, granule or pellet form and is preferably an alkali metal, calcium hydride, lithium hydride, lithium aluminum hydride, $B_{10}H_{14}$, sodium borohydride, lithium borohydride, and combinations thereof. Suitable alkali metals non-exclusively include lithium, sodium and potassium. The preferred materials for the non-fluid substance are sodium borohydride, lithium borohydride and lithium aluminum hydride. The non-fluid substance is also preferably combined with a hydrogen generation catalyst to catalyze the reaction of the water vapor and the non-fluid substance. Suitable catalysts include non-exclusively include cobalt, nickel, ruthenium, magnesium and alloys and combinations thereof.

Attached to the hydrogen gas generator 14 is a fuel cell 16. Hydrogen powered fuel cells are well known in the art. The dimensions of the fuel cell 16 also depend on the intended use of the power generator 10. In small scale applications, the fuel cell is preferably from about 0.1 cm to about 0.2 cm in height, from about 0.1 cm to about 1.0 cm in width and from about 0.1 cm to about 1.0 cm in length. As seen in FIG. 3, it is preferred that the fuel cell 16 is at least partially surrounded by a thermal insulator 28. The thermal insulator 28 may comprise anything suitable to maintain the fuel cell above the freezing temperature of water. Suitable thermal insulators non-exclusively include insulators comprising a plastic foam. In addition to the thermal insulator, a heater 34 may be placed adjacent to or attached to the fuel cell 16 to maintain the temperature of the fuel cell and power generator 10 above the freezing temperature of water. In the preferred embodiment of the invention, the power generator 10 will be maintained at a temperature of from about −20° C. to about 50° C., more preferably from about 0° C. to about 50° C. and most preferably from about 20° C. to about 50° C. while in use.

As seen in FIGS. 1 and 3, the water vapor generator 12 is preferably connected to the hydrogen generator 14 via at least one conduit 18 containing a valve, and the hydrogen generator 14 is preferably connected to the fuel cell 16 via at least one conduit 18. The conduits 18 may also connect to the water vapor generator so that more humid hydrogen is passed to the fuel cell. The conduits 18 may comprise anything sufficient to facilitate the transport of water vapor from the water vapor generator 12 to the hydrogen generator 14 and hydrogen gas from the hydrogen generator 14 to the fuel cell 16. As seen in FIG. 1, in the preferred embodiment of the invention, the power generator 10 also includes a return line 20 that directs any residual water vapor and hydrogen gas from the fuel cell 16 back to the water vapor generator 12. The return line 20 is preferably substantially identical to conduits 18. As shown in FIG. 2, neither the conduits 18 nor the return line 20 are necessary elements for the efficient performance of the invention. In this embodiment, the water vapor generator 12 may be directly attached to the hydrogen gas generator 14 and the fuel cell 16 directly attached to the hydrogen gas generator 14.

It is further preferred that at least one pump 22 is coupled with the power generator 10 to pump hydrogen gas and water vapor between the water vapor generator 12 and the hydrogen gas generator 14. The pump 22 is preferably electrically connected to and powered by the fuel cell 16, with the pump optionally being powered initially by power stored in device 30. In a preferred embodiment, the pump is a mesoscopic pump, or mesopump. One preferred mesopump is described in U.S. Pat. No. 5,836,750, which is incorporated herein by reference. It is also preferred that an inert gas is initially present within the water vapor generator 12, hydrogen gas generator 14, fuel cell 16 and in the optional conduits 18 and optional return line 20. The inert gas assists in transporting water vapor and hydrogen gas to the fuel cell 16 and is preferably a gas selected from the group consisting of nitrogen, argon, combinations thereof and the like.

In use, the water vapor generator 12 may generate water vapor in a variety of ways, such as by evaporation of liquid water from the water vapor generator 12, by diffusion of water molecules into the air, by bubbling gas through the water, or by passing gas over the surface of the liquid water or the ice if present or over surfaces wetted by the water, or by pumping water so as to induce a higher vapor generation rate. Once the water vapor is generated it is directed from the water vapor generator 12 toward the hydrogen gas generator 16 either via diffusion, via pressure exerted by tensile membrane 32, via a force generated by pump 22, by a flow induced as water vapor is consumed in the hydrogen generator, or by flow induced as hydrogen is consumed by the fuel cell. The water vapor then passes through either the porous plugs 24 or open valve 26, preferably into conduit 18 and then to the hydrogen gas generator 14 which is at least partially filled with the substantially non-fluid substance. Once the water vapor passes into the hydrogen gas generator 16, the substantially non-fluid substance reacts with the water vapor, consuming water vapor to generate hydrogen gas. The hydrogen gas and any residual water vapor is then directed from the hydrogen gas generator 14 to the fuel cell 1, preferably via another conduit 18. Once the hydrogen gas reaches the fuel cell, the hydrogen gas is reacted with oxygen gas within the fuel cell, consuming the hydrogen gas to generate electricity. Subsequently, any residual water vapor and any residual hydrogen gas are transported from the fuel cell 16 back to the water vapor generator 12, preferably via a return line 20.

Figure 4:
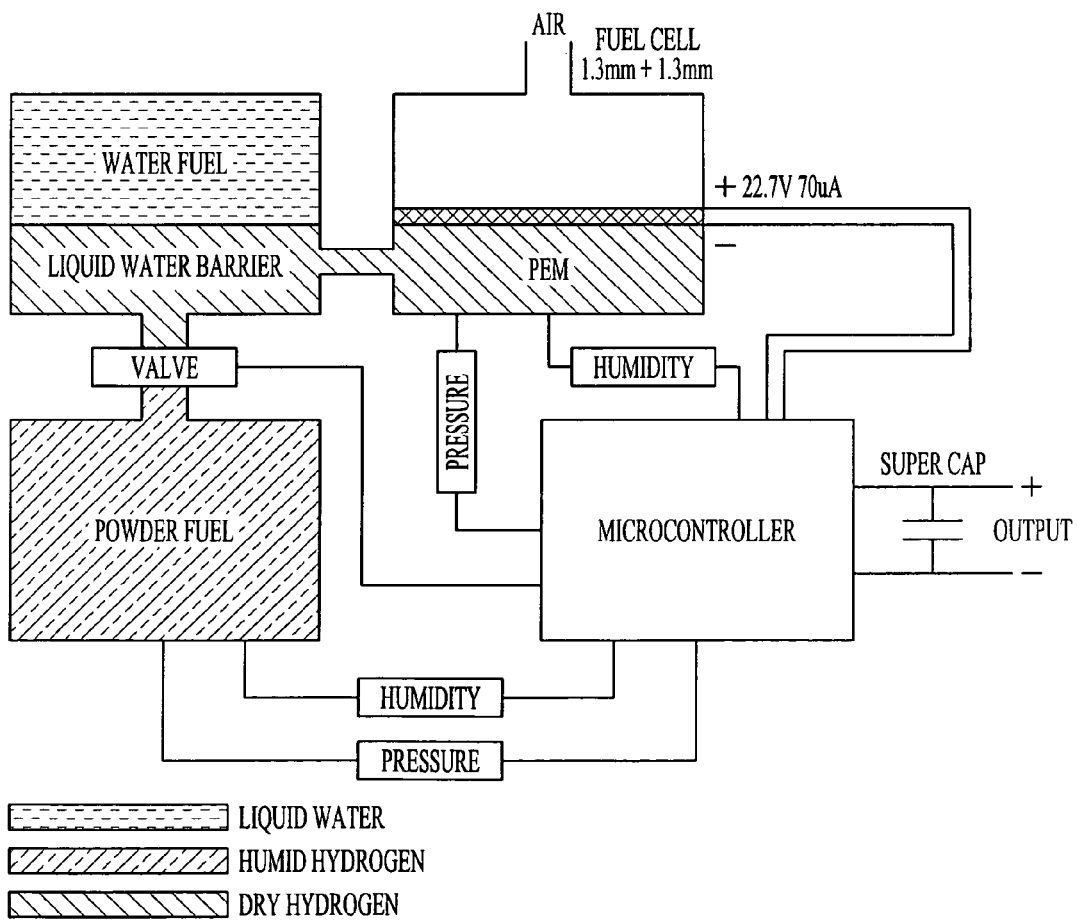
FIG. 4 illustrates the components for the electronic control system and the overall interconnection scheme of the electrical power generator.

FIG. 4 shows preferred components for the electronic control system and the overall interconnection scheme of the electrical power generator. A closed loop drive and feed back control circuit is provided for the fluid drive control and output voltage control. An important requirement is to control the pumping rate of fuel, water or water vapor, in order to maintain an adequate flow and pressure of hydrogen in the fuel cell and to accommodate the electrical power required by the load. An active control system regulates the output voltage, and for some applications, to store electrical energy in a small device such as a lithium button cell or capacitor for applications requiring very fast bursts of high electrical power. A microcontroller-based electronic circuit uses conventional components such as a voltage multiplier, pump driving circuit, signal conditioning circuit, and low power control circuit. Appropriate sensors allow internal functions to be measured and controlled. Electrical power storage systems such as a lithium button cell or a super capacitor and a gas energy reservoir (hydrogen storage) are alternate methods of providing for short high power (burst mode) operation, and initial startup from long term storage.

Figure 5:
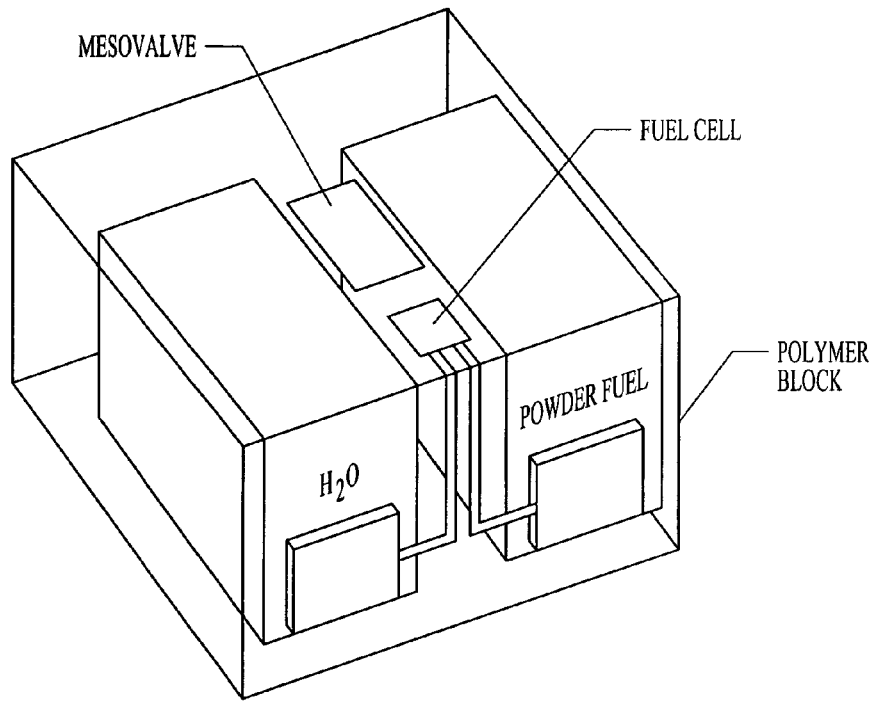
FIG. 5 is a perspective view of the electrical power generator formed within a polymeric block.
Figure 6:
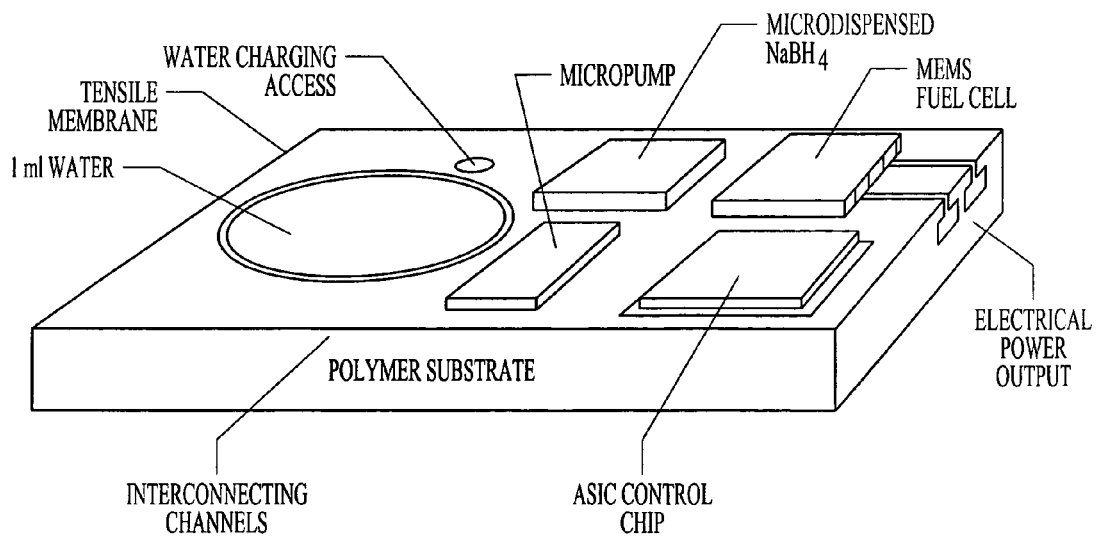
FIG. 6 illustrates a perspective view of an electrical power generator and its component parts, in the form of a thin molded card.

Preferably, all of the above mentioned component parts of the power generator including the water vapor generator, the hydrogen gas generator, the fuel cell, the optional conduits, mesopump and mesovalve are formed within a polymeric block composed of a material such as a polyethylene, a polyimide, a polycarbonate, an acrylic, or combinations thereof. A representation of the electrical power generator and its component parts formed within a polymeric block is shown in FIG. 5. The polymer package provides protection of the gas diffusion electrodes from stresses of the outside world and allows a way to attach the fuel cell electrically to the outside world, and further allows the fuel cell cathode to passively consume oxygen from air, and further allows the anode to be plumbed into the hydrogen generator in a planar assembly. Generators in the form of a molded card are inexpensive, light weight, impermeable and inert, and the required components can be readily incorporated and linked with fluid and electrical interconnections. A representation of the electrical power generator and its component parts, in the form of a thin molded card is shown in FIG. 6.

Figure 7:
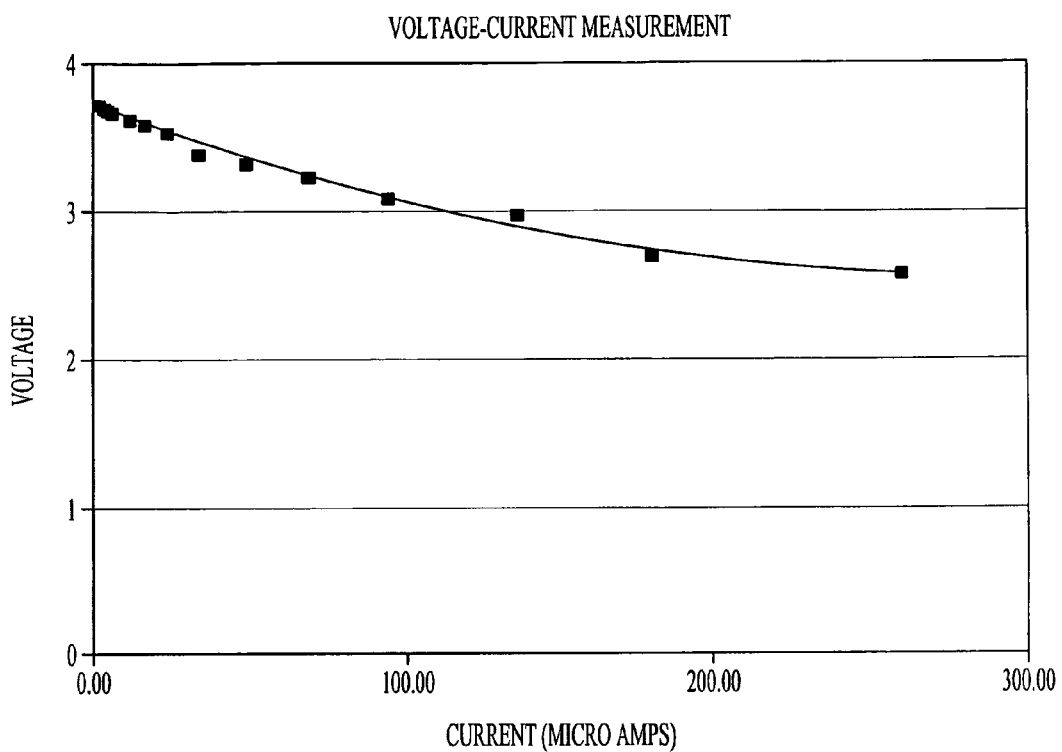
FIG. 7 is a graph of voltage current measurement of the electrical power generator.

The inventive electrical power generator employing a MEMS PEM fuel cell with actively-regulated hydrogen generator, fueled by water and a solid chemical, has an energy density significantly greater than a lithium battery. Such may be produced in a range of standard sizes, in a similar manner to the series of batteries AAA, AA etc. Such generators are capable of supplying the following minimum characteristics: 2.7V nominal voltage (2.5 to 3.5V), 70 uA mean output current; 30 mA, 100 msec power pulses at an average rate of 1 every 10 minutes (for data Tx/Rx), 0° C. to 65° C. operation, >10 year shelf life, 1 year operation (1.6 Watt hours) and maximum 1 gram weight. The generator will be capable of lifetimes of more than 10 years by simply adding more stored fuel. Unlike alkaline or lithium batteries, the generator is capable of complete shutdown, and hence in principle offers unlimited shelf life, and operational life only limited by the stored fuel. This is an important advantage over batteries for commercial applications. FIG. 7 shows a graph of typical voltage current measurement of an electrical power generator according to the invention. FIGS. 10A-10I show the process steps for forming a MEMS fuel cell.

Figure 11:
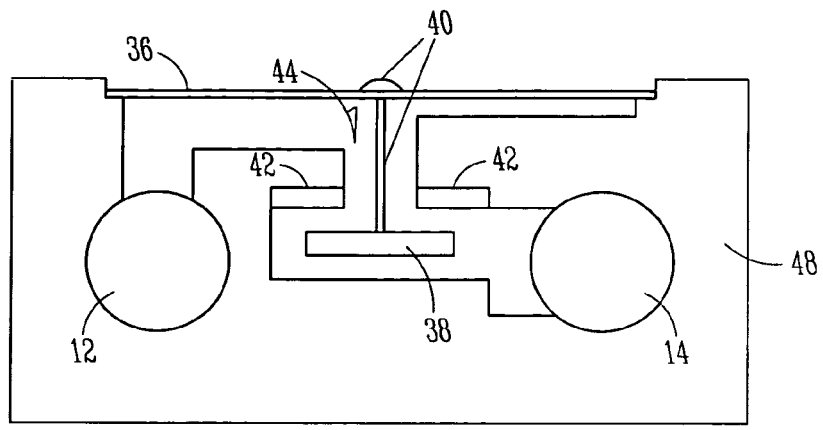
FIG. 11 is a cross-sectional side-view of a hydrogen gas generating apparatus of the invention having a non-electrically actuated valve.
Figure 12:
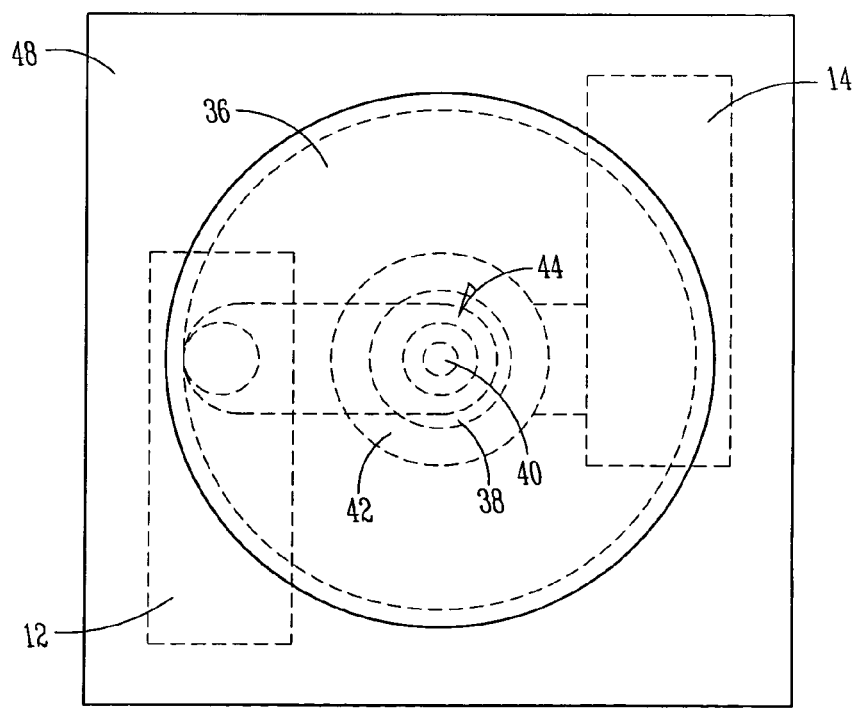
FIG. 12 is a top-view of a hydrogen gas generating apparatus of the invention regulated by a non-electrically actuated valve.
Figure 13:
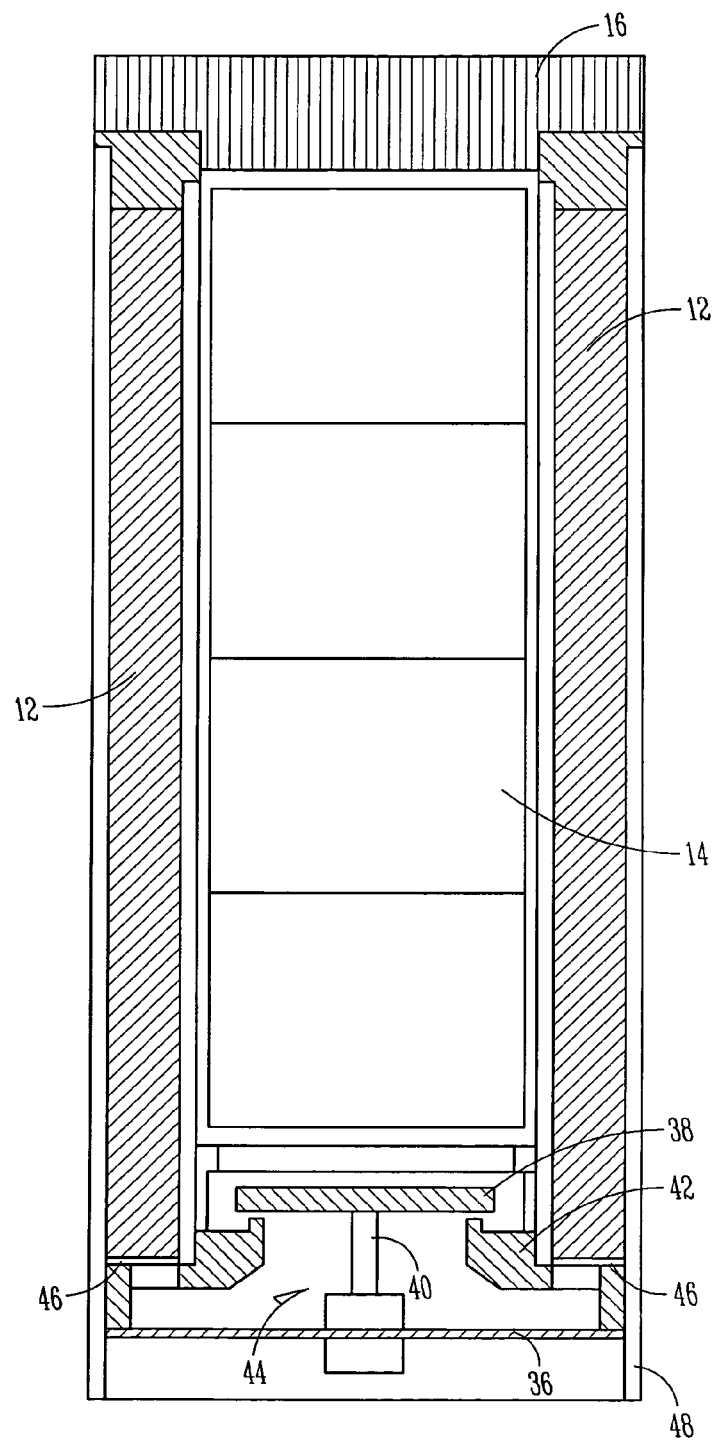
FIG. 13 is a cross-sectional side view of a hydrogen gas generating apparatus of the invention having a non-electrically actuated valve.

The invention also provides a hydrogen gas generating apparatus that utilizes a non-electrically actuated valve to regulate the flow of water vapor from a water vapor generator to a hydrogen gas generator. This apparatus is illustrated in FIGS. 11-13. FIG. 11 is a cross-sectional side-view of a hydrogen gas generating apparatus showing the component parts of the valve. FIG. 12 is a top-view of the hydrogen gas generating apparatus showing the preferred shape and position of the component parts of the apparatus. As shown in FIGS. 11 and 12, the valve is positioned through a conduit 44 that connects a water vapor generator 12 and a hydrogen gas generator 14, allowing for the regulated passage of water vapor and hydrogen gas between the water vapor generator and the hydrogen gas generator. The valve itself comprises a pneumatically actuated flexible diaphragm 36 having a periphery that is fixed to the apparatus housing 48; a valve disc 38 positioned opposite the diaphragm 36 and mating with the conduit 44 for alternately opening and closing the conduit 44; a rod connector 40 having opposite ends, the rod 40 extending through a portion of the conduit 44 and attached at one of its ends to the diaphragm 36 and attached at its opposite end to the valve disc 38; and a seal 42 attached around a periphery of the conduit 44 and positioned for mating with the valve disc 38 when the valve disk 38 is positioned to close the conduit 44. In a preferred embodiment of the invention, the diaphragm 36 also comprises an outer surface of the housing.

As seen in the figures, the valve is positioned through the conduit 44 for alternately opening and closing the conduit 44. More specifically, when the conduit 44 is open, water vapor is allowed to pass from the water vapor generator 12 to the hydrogen gas generator 14, resulting in hydrogen gas generation. When the conduit is closed, the valve disc 38 mates with the seal 42, preventing the flow of water vapor and hydrogen gas through the conduit 44. In the preferred embodiment of the invention, a fuel cell 16 is joined with the hydrogen gas generating apparatus, which fuel cell 16 is capable of consuming the generated hydrogen gas to generate electricity. The fuel cell 16 may be attached directly to any component of the apparatus, e.g. to water vapor generator 12 or hydrogen generator 14, or indirectly via a suitable channel.

FIG. 13 illustrates a cross-sectional view of an alternate embodiment of a power generator including a fuel cell 16 and having an identical non-electrically actuated valve regulating the flow of water vapor from a water vapor generator to a hydrogen gas generator. In this embodiment, a water vapor generator 12 surrounds a hydrogen gas generator 14. As water vapor is generated by the water vapor generator 12, it preferably diffuses into a conduit 44 through a suitable membrane 46. Membrane 46 may comprise a tensile membrane, porous plugs or a valve such as those described for the embodiments of FIGS. 1-3. Similar to the embodiment of FIGS. 11 and 12, a valve is positioned through conduit 44 that connects the water vapor generator 12 and hydrogen gas generator 14, regulating the flow of water vapor from the water vapor generator 12 to the hydrogen gas generator 14. Further, in this embodiment, there is preferably a particulate filter present between the hydrogen gas generator 14 and the fuel cell 16 that allows hydrogen gas to pass into the fuel cell 16, but prevents the non-fluid substance from reaching the fuel cell 16.

The actuation of the valve is controlled by the differential pressure between atmospheric pressure, i.e. external pressure, and the internal hydrogen gas pressure of the apparatus. As the internal gas pressure of the apparatus rises above atmospheric pressure due to the generation of hydrogen gas, the diaphragm 36 will bend outward slightly. This causes the connector 40 to pull the valve disc 38 against the seal 42, closing the valve and preventing the flow of additional water vapor to the hydrogen gas generator 14. With the valve closed, hydrogen production ceases. This also prevents the internal gas pressure from rising further. As hydrogen is consumed, such as by a fuel cell 16, the internal gas pressure drops, allowing the valve disc 38 to disengage the seal 42 and opening the valve. Accordingly, hydrogen gas is automatically produced at the rate at which it is consumed. Further, when a fuel cell 16 is attached to the apparatus, hydrogen gas will be available for consumption by the fuel cell at all times, as some quantity of hydrogen will consistently be present in the apparatus.

In the preferred embodiment of the invention, the internal $H_2$ pressure of the apparatus when in the closed position is from about 1 psi to about 10 psi, more preferably from about 1 psi to about 5 psi, and most preferably from 1 psi to about 2 psi. More particularly, the valve will be fully shut when no hydrogen gas is used by the fuel cell, and will open the amount required to meet consumption rate of the hydrogen gas. In the preferred embodiment of the invention, an internal hydrogen gas pressure of greater than 1 psi will maintain the valve in the conduit closed position. In the most preferred embodiment of the invention, the internal pressure of the power generator is maintained at about 2 psi at all times, wherein when the pressure drops below about 2 psi, the valve will open slightly until the internal pressure raises to at or above about 2 psi, causing the valve to close. As described above, the valve is controlled by the pressure of the hydrogen gas and the valve also regulates the internal pressure of the hydrogen gas.

The dimensions of the component parts are preferably very small in scale but may vary with respect to the particular application of the valve. In the preferred embodiment of the invention, the diaphragm 36 preferably comprises a thin circular plate preferably having a diameter of from about 1 cm to about 3 cm, more preferably from about 1 cm to about 2 cm. The valve disc preferably has a diameter of from about 0.2 to about 1 cm, more preferably from about 0.2 cm to about 0.5 cm. In the preferred embodiment of the invention, the rod connector 40 may comprise a screw or a bolt, but any other means of connecting the diaphragm 36 to the valve disc 38 is suitable such that the valve can alternately open and close the conduit. Each of the diaphragm 36, valve disc 38 and seal 42 may be fabricated of a suitable polymeric material, but may also comprise a metal composite material as determined by the requirements of the intended use of the valve.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An electrical power generator comprising:
   a) a water vapor generator;
   b) a hydrogen gas generator attached to the water vapor generator, said hydrogen generator containing a substantially non-fluid substance which reacts with water vapor to generate hydrogen gas; said hydrogen generator being coupled to said water vapor generator;
   c) a fuel cell attached to the hydrogen gas generator; said fuel cell being coupled to said hydrogen gas generator;
   d) a porous plug or at least one valve that regulates water vapor flow to the hydrogen gas generator, and
   e) a tensile membrane within the water vapor generator which exerts pressure directing water vapor from the water vapor generator to the hydrogen gas generator.

2. The power generator of claim 1 further comprising at least one conduit connecting the water vapor generator to the hydrogen gas generator and at least one conduit connecting the generator to the fuel cell.

3. The power generator of claim 1 further comprising a return line which directs residual water vapor and hydrogen gas from the fuel cell to the water vapor generator.

4. The power generator of claim 1 wherein the water vapor generator comprises a chamber at least partially filled with water.

5. The power generator of claim 1 wherein the water vapor generator comprises a chamber at least partially filled with a mixture of water and alcohol.

6. The power generator of claim 1 wherein the water vapor generator comprises a chamber at least partially filled with water vapor.

7. The power generator of claim 1 wherein the water vapor generator is at least partially filled with ice.

8. The power generator of claim 1 wherein the hydrogen gas generator comprises a chamber at least partially filled with a substantially non-fluid substance which reacts with water vapor to generate hydrogen gas.

9. The power generator of claim 1 wherein the hydrogen gas generator comprises a chamber at least partially filled with a substantially non-fluid substance which reacts with a mixture of alcohol and water vapor to generate hydrogen gas.

10. The power generator of claim 1 further comprising hydrogen gas initially loaded within at least one of said water vapor generator, hydrogen gas generator, fuel cell and said optional conduits.

11. The power generator of claim 1 further comprising at least one device attached to at least one of said water vapor generator, said hydrogen generator or said fuel cell for causing an initial flow of water vapor from the water vapor generator to the hydrogen gas generator.

12. The power generator of claim 1 wherein said substantially non-fluid substance comprises a material selected from the group consisting of alkali metals, calcium hydride, lithium hydride, lithium aluminum hydride, $B_{10}H_{14}$, sodium borohydride, lithium borohydride and combinations thereof.

13. The power generator of claim 1 wherein said substantially non-fluid substance comprises sodium borohydride.

14. The power generator of claim 1 wherein said substantially non-fluid substance comprises lithium borohydride.

15. The power generator of claim 1 wherein said substantially non-fluid substance comprises lithium aluminum hydride.

16. The power generator of claim 1 further comprising a hydrogen generation catalyst combined with said substantially non-fluid substance.

17. The power generator of claim 16 wherein said catalyst is selected from the group consisting of cobalt, nickel, ruthenium and alloys and combinations thereof.

18. The power generator of claim 1 further comprising at least one pump for pumping hydrogen gas and water vapor between the water vapor generator and the fuel cell.

19. The power generator of claim 18 wherein the at least one pump comprises a mesopump.

20. The power generator of claim 1 wherein the at least one valve comprises a mesovalve.

21. The power generator of claim 1 wherein the at least one valve is controlled by gas pressure within the power generator.

22. The power generator of claim 1 wherein the at least one valve regulates gas pressure within the power generator.

23. The power generator of claim 1 wherein said porous plugs are adjacent to said water vapor generator, said plugs substantially impeding the flow of liquid water from said water vapor generator and substantially allowing the flow of hydrogen gas and water vapor into and out of said water vapor generator.

24. The power generator of claim 1 wherein said substantially non-fluid substance is in powder, granule or pellet form.

25. The power generator of claim 1 wherein said fuel cell is at least partially surrounded by a thermal insulator.

26. The power generator of claim 1 further comprising a heater adjacent to the fuel cell.

27. The power generator of claim 1 wherein the water vapor generator, the hydrogen gas generator, said fuel cell and said optional conduits are formed within a polymeric block.

28. The power generator of claim 27 wherein the polymeric block comprises a polyethylene, a polyimide, a polycarbonate, an acrylic, or combinations thereof.

* * * * *